United States Patent
Koshnick

(10) Patent No.: US 9,533,320 B1
(45) Date of Patent: Jan. 3, 2017

(54) PORTABLE VEHICLE UNDERCARRIAGE CLEANER

(71) Applicant: Jeffrey Albert Koshnick, Bloomfield, NJ (US)

(72) Inventor: Jeffrey Albert Koshnick, Bloomfield, NJ (US)

(73) Assignee: Jeffrey Albert Koshnick, Milford, PA (US)

( * ) Notice: Subject to any disclaimer, the term of this patent is extended or adjusted under 35 U.S.C. 154(b) by 253 days.

(21) Appl. No.: 14/283,225

(22) Filed: May 21, 2014

(51) Int. Cl.
*B05B 9/01* (2006.01)

(52) U.S. Cl.
CPC ........................................ *B05B 9/01* (2013.01)

(58) Field of Classification Search
CPC ....................................................... B05B 9/01
USPC .......... 239/565, 569, 207, 525–532
See application file for complete search history.

(56) References Cited

U.S. PATENT DOCUMENTS

| | | | |
|---|---|---|---|
| 3,194,444 A * | 7/1965 | Hubert | A01C 23/042 137/205.5 |
| 4,095,746 A * | 6/1978 | Anderberg | B05B 1/202 239/754 |
| 4,984,746 A | 1/1991 | Joyal | |
| 5,653,392 A * | 8/1997 | Wells | B05B 1/3006 239/588 |
| 5,707,014 A | 1/1998 | Chang et al. | |
| 6,045,064 A | 4/2000 | Abraham | |
| 6,079,640 A | 6/2000 | Merritts | |
| 6,247,658 B1 | 6/2001 | Bakas | |
| 6,779,744 B1 | 8/2004 | Marine et al. | |
| 7,208,051 B2 | 4/2007 | Zinski et al. | |

* cited by examiner

*Primary Examiner* — Justin Jonaitis

(57) ABSTRACT

The vehicle undercarriage cleaner is portable, lightweight, cost-effective, and is simple to use which makes it a new and improved way of cleaning the undercarriage of a vehicle. The device lay on the ground and is connected to a garden hose type connection via a connector. The connector is connected to the singular end of a t-connector which is connected to conduits at the second and third opposing ends of the t-connector. The conduits are connected to end caps at each respective end. The sprayers are connected to the conduits, end caps, and perhaps the t-connector and connector. When liquid is introduced it will run through the device and spray upward and outward through the sprayers. The consumer needs only to slowly drive a vehicle back and forth over the device to clean the undercarriage of the vehicle to satisfaction. Other embodiments are described.

15 Claims, 3 Drawing Sheets

PORTABLE VEHICLE UNDERCARRIAGE CLEANER

BACKGROUND

Field

This application relates to vehicle cleaning devices, specifically to such devices that clean the undercarriage of vehicles.

Prior Art

Vehicles accumulate corrosive materials on their undercarriages such as but not limited to dirt, road salt, and chemicals. If not removed, these materials, over time, will erode parts of the vehicle resulting in damage and costly repairs to the consumer. Cleaning the undercarriage of a vehicle has been shown to stop the negative effects of such materials and save the consumer costly repairs in the future.

Having a vehicle washed professionally can be a costly endeavor, especially on a consistent basis. Professional vehicle washes will charge extra to wash the undercarriage of the vehicle, allowing only one pass through the undercarriage cleaning section each wash, which may not clean the affected areas well enough. Many professional vehicle washes do not offer an undercarriage vehicle wash. For these reasons many consumers wash their own vehicles at home.

A number of such devices for cleaning the undercarriage of a vehicle at home have been developed and patents granted. Many of these prior-art devices have been developed to rival the cleaning methods of a professional vehicle wash. These devices typically rely upon a conventional liquid source such as a garden hose type outlet via the home of a consumer.

These devices are typically larger in size and have the home-consumer exerting their own physical energy to use the device. Most of the devices have the consumer holding a spray handle at one end of the device and physically moving and or rolling the device back and forth to clean the undercarriage of the vehicle. Many of the devices also require the use of a pressure washer.

Among the examples of such devices are those of U.S. Pat. No. 6,045,064 issued on Apr. 4, 2000 to Abraham; U.S. Pat. No. 6,247,658 issued on Jun. 19, 2001 to Bakas; U.S. Pat. No. 5,707,014 issued on Jan. 13, 1998 to Chan, et al.; U.S. Pat. No. 6,079,640 issued on Jun. 27, 2000 to Merritts; U.S. Pat. No. 4,984,746 issued on Jan. 15, 1991 to Joyal; U.S. Pat. No. 7,208,051 issued on Apr. 24, 2007 to Zinski, et al.; U.S. Pat. No. 6,779,744 issued on Aug. 24, 2004 to Marine, et al.; and U.S. Pat. No. 5,653,392 issued on Aug. 5, 1997 to Wells.

The aforementioned patents of Bakas, Chan, Joyal, and Zinski all use certain wheels to maneuver the device along the undercarriage of the vehicle. This can cause issues because the wheels can be obstructed by many different objects, and the surface itself, hindering the process of cleaning the vehicle. The consumer will expend excess time and energy trying to maneuver around the various obstacles.

In the patents of Zinski, Joyal, Bakas, and Abraham the device employs a handle with a squeeze style trigger for the operator to use. This trigger must be squeezed by the hand of the operator to release liquid into the device. This is another example of an expenditure of energy on the part of the operator which will add to the tediousness of using the device to wash the undercarriage of a vehicle. The patents of Abraham and Merritts require the operator to hold the full weight of the device while operating it. This again will have the operator expend more energy and cause possible muscular issues to the user while using the device.

The patents of Bakas, Chan, Joyal, Zinski, Merrits, and Abraham require the user to use specific motions and energy to operate their devices, thereby limiting the use of these devices by people with certain handicaps and limited mobility.

With the patents of Bakas, Chan, Joyal, Zinski, and Marine the materials needed to produce each device readily exceed what is needed to clean the undercarriage of a vehicle. This is especially prevalent with the devices of Joyal, Zinski, and Marine. Marines' device does have the added benefit of not having the consumer spend their energy using it but it is very bulky and therefore harder to transport if need be. Also, the entire frame is not needed to clean the entire undercarriage of a vehicle and adds unnecessary costs to the manufacturing of the device. The device of Joyal has a rounded t-shaped lower body which can also be bulky to transport and cost more to produce with the material used. Also, with the devices of Bakas, Chan, Joyal, and Zinski the material needed for the different lengths of tubing, the housing for the sprayers, the squeeze triggers (except for Chan), etc. add to the cost of the device.

Furthermore, with the patents of Bakas, Zinski, and Wells the devices may and/or will use a high pressurized stream of liquid via some type of pump or pressure washer to clean the undercarriage of a vehicle. This is not only unnecessary but may damage or destroy the protective undercoating that is applied to vehicles. This will void any positive effects the device may have on the vehicle by removing dirt, road salt, etc., from the undercarriage.

SUMMARY

The essence of the device is to have the consumer expend much less physical energy, save time, and save money while using a much simpler device. One embodiment of the device consists of a connector for a conventional liquid source which allows liquid to flow through a t-connector and conduits that are stifled by end caps. Certain sprayers are attached to the device at various locations which allow the liquid to flow in various angled directions to clean the undercarriage of a vehicle.

The device lay on the ground with the conventional liquid source attached to it and the consumer merely drives their vehicle back and forth over the device to clean the undercarriage of the vehicle.

DRAWINGS

Figures

REFERENCE NUMERALS

10—Undercarriage cleaning device
12—Connector
14—T-connector
16—Conduits
18—End Caps
20—Sprayers 22—Container
24—Release Valve
30—Vehicle
32—Garden Hose Type Connection

DETAILED DESCRIPTION OF THE PREFERRED EMBODIMENT

FIG. 1

Figure 1:
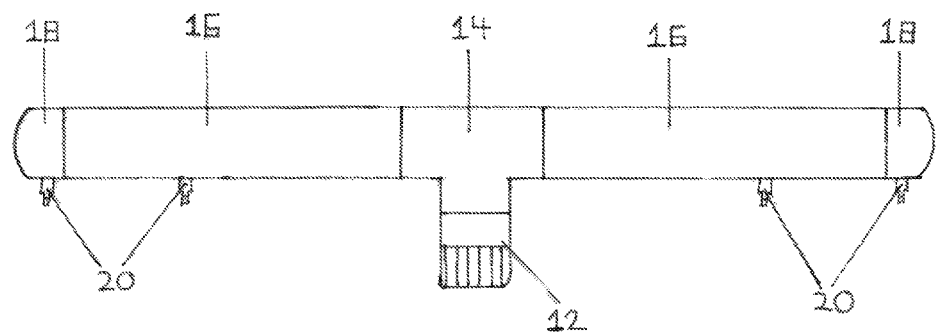
FIG. 1 shows a top side view of the preferred embodiment of the device.

Referring to FIG. 1, an exemplary undercarriage cleaning device in accordance with one embodiment of the present device consists of a connector 12 having one female threaded end which connects to a male threaded end of a garden hose type connection to supply the liquid. The opposing end of connector 12 will have male threading which will be connected to the singular end of a t-connector 14 with female threading.

Further as shown in FIG. 1, the second and third opposing ends of t-connector 14 are connected to the inner opposing ends of conduits 16 by adhesive. At the outer opposing ends of conduits 16 will be connected end caps 18. In this embodiment, end caps 18 are secured by adhesive to conduits 16.

Furthermore as shown in FIG. 1, one embodiment of the device has sprayers 20 being positioned respectively on end caps 18. Sprayers 20 will be positioned approximately ⅔ of the way down conduits 16 closer to end caps 18. Sprayers 20 will be connected to conduits 16 and end caps 18 by inserting a male threaded end of sprayers 20 into a predrilled hole. Sprayers 20 will have a spray radius of 180 degrees and be made of a composite plastic.

In the preferred embodiment, the full length of the device from end cap 18 to end cap 18 is approximately 81 cm (32 inches). The elements connector 12, t-connector 14, conduits 16, and end caps 18 are composed of polyvinylchloride and are of an inner diameter of 1.27 cm (½ inch).

Operation

FIG. 2

Figure 2:
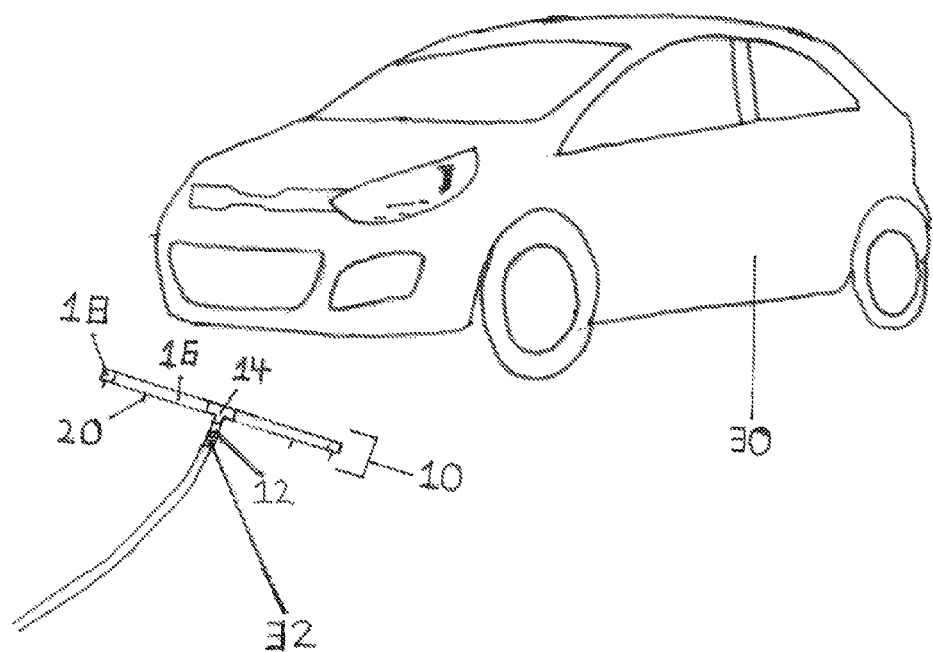
FIG. 2 shows a perspective view of one embodiment of the device.

In referring to FIG. 2, operating device 10 in this embodiment requires first to position vehicle 30 in an area where a conventional liquid source and garden hose type connection 32 is accessible. Place device 10 on the ground in front of vehicle 30 so it is parallel with the front end of vehicle 30 and so the openings of sprayers 20 are facing upward. Make sure the conventional hose protruding from connection 32 is in a straight line going to connector 12 as to not run over the conventional hose. Connect the male threaded end of connection 32 to the female threaded end of connector 12. Once this is done the liquid must be turned on at its source. At this point liquid will pass through connector 12, t-connector 14, conduits 16, and be stifled by end caps 18. The liquid will pass in an upward and outward motion, depending on the embodiment, through sprayers 20.

Next, slowly drive vehicle 30 forward until the liquid is hitting the rear bumper then put vehicle 30 in reverse until the liquid is hitting the front bumper. Repeat this process several times. Sprayers 20 will not only clean the undercarriage of vehicle 30 but the inside of the wheels as well as a result of the spray radius of certain embodiments. When the undercarriage of vehicle 30 is cleaned to satisfaction, turn off the conventional liquid source, disconnect connection 32 from connector 12, and store device 10 accordingly.

FIG. 3

Alternative Embodiment

Figure 3:
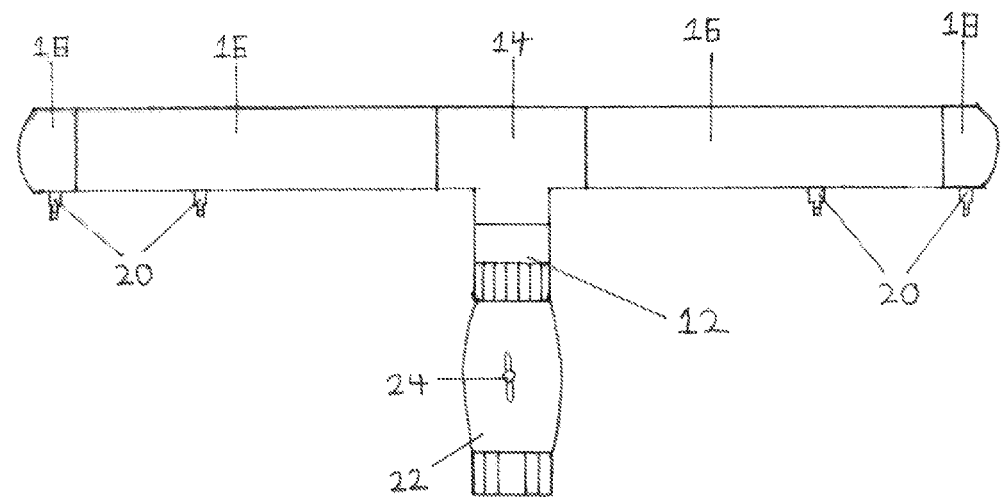
FIG. 3 shows a top side view of an alternative embodiment of the device

With regard to FIG. 3 and an alternative embodiment of the device, a separate container 22 holding a certain cleaning solution connects to connector 12. One end of container 22 will have male threading which will be connected to the female threaded end of connector 12. On its opposing end, container 22 will have a female threading which will connect to a garden hose type connections' male threaded end. Container 22 will have two separate compartments that will lay one on top of the other. A release valve 24 will be attached to the top of container 22. In this embodiment container 22 and valve 24 are composed of a rigid plastic.

Figure 4:
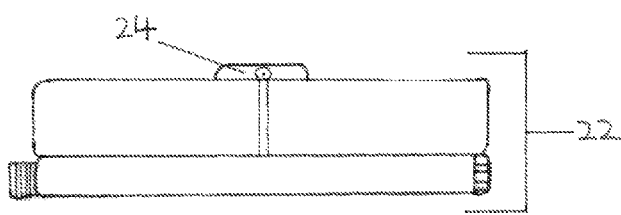
FIG. 4 shows a left side view of the cleaning solution container in accordance with an alternative embodiment.

In referring to FIG. 4, container 22 and valve 24 are shown from the left side view to illustrate the two separate compartments of container 22 and how valve 24 relates to these two separate compartments.

FIGS. 2, 3

Alternative Embodiment—Operation

In referring to FIGS. 2 and 3 and another embodiment of the device, the difference in the operation is that connection 32 will be connected to container 22 instead of connector 12. Valve 24, when turned, will release a certain amount of cleaning solution from the top compartment of container 22 into the flow of liquid through the device depending on the radius of such turn. This will enable device 10 to release liquid plus cleaning solution to the undercarriage of vehicle 30. When turned to the off position, valve 24 will inhibit cleaning solution from entering device 10. This will allow only liquid to flow through device 10.

CONCLUSION, RAMIFICATION, AND SCOPE

In reading the prior information, one will realize the various embodiments of the undercarriage cleaning device will provide a simpler, more economical, and energy saving advantage to the home consumer. The limited amount of elements needed to manufacture the device equates to low manufacturing and retail costs. Also, the simplicity and ease of use of the device is appealing to a wide range of people including people with handicaps and limited mobility.

Certain variations are possible. For example, the length of the device may vary. The elements connector 12, t-connector 14, conduits 16, and end caps 18 may be composed of another rigid plastic, metallic material, etc., and of a different inner diameter as in 1.905 cm (¾ inch), 2.54 cm (1 inch), etc.

In other embodiments, sprayers 20 may have a different spray radius and or pattern as in 45 degrees, 90 degrees, cone, spiral, etc., and may be positioned in various locations along conduits 16, end caps 18, t-connector 14, and connector 12. Further, sprayers 20 may be more or less numerous and be connected to conduits 16, end caps 18, t-connector 14, and connector 12 at various angles. Sprayers 20 may be composed of polyvinylchloride, another rigid plastic, metallic material, etc.

In one embodiment of the device, sprayers 20 may be eliminated altogether. In place of sprayers 20 may be orifices that are placed throughout the entire device, a channel or channels that run along the top side of the entire device, etc. The orifices, channels, etc., may be placed at various angles and locations.

In other embodiments, the second and third opposing ends of t-connector 14 may have female threading and the inner opposing ends of conduits 16 may have male threading to be connected to each end of t-connector 14 therein. One embodiment may have the outer opposing ends of conduits 16 have male threading which will connect to end caps 18 with female threading. Sprayers 20 may also be connected by, but not limited to, adhesive to each predrilled hole. In other embodiments, connector 12 and t-connector 14 may be connected together by, but not limited to, other such means as adhesive.

In another alternative embodiment, container 22 may be connected to connector 12 by adhesive. Container 22 and valve 24 may be composed of polyvinylchloride, a metallic material, etc.

In another alternative embodiment of the device, an on/off valve may be connected to connector 12 by the male threaded end of the on/off valve being connected to the female threaded end of connector 12. On its opposing end, the on/off valve would have female threading which would connect to a garden hose type connections' male threaded end. The on/off valve gives the consumer the added convenience of controlling the flow of liquid through the device without having to solely rely upon the controls of a conventional liquid source to regulate the flow of liquid.

With respect to another alternative embodiment of the device, all of the separate elements may be eliminated and the entire device may be manufactured using one single molding.

With respect to yet another alternative embodiment of the device, the end caps may be replaced by plugs, etc., at the outer opposing ends of conduits 16.

With respect to different embodiments, the liquid that flows through the device may be water, cleaning solution mixed with water, etc.

A conventional liquid source may include a range of different connections as in a conventional garden hose, steel pipe, copper pipe, plastic tube, etc. It may also be found in different locations as in a residential home, school, small or large business, etc.

In an obscure use of embodiments of the device a consumer may clean the undercarriage and blades of a lawn mower. A consumer would typically have to tilt a lawn mower on its side (if the walk-behind type) to clean the undercarriage which may be both difficult and dangerous. In the same manner as mentioned above, the consumer needs only to move and or drive a lawn mower over the device to clean its undercarriage and blades to satisfaction.

The aforementioned embodiments are to be considered a perspective of the device and should not limit the device in its construction, modification, or uses. The embodiments listed are just several and the scope of the device may vary in its length, dimension, diameter, and may include various numbers of elements. Thus, the appended claims and their legal equivalents should be the determining factor in the scope of the embodiments.

I claim:

1. An apparatus consisting of:
   a. a connector being of a predetermined size having one end of male threading and one end of female threading and a cylindrical side wall extending between said male and female threading
   b. a t-connector of predetermined size having a singular end with female threading and second and third opposing ends
   c. a first and second conduit of equal length and predetermined size with each having one inner opposing end and one outer opposing end
   d. a first and second end cap of predetermined size each having an inner end
   e. a plurality of sprayers of predetermined size having a bottom end with male threading and
   f. means for joining said connectors male threaded end directly to said t-connectors singular end with female threading, a means for joining said first and second conduits inner opposing ends directly to respective ones of said t-connector's second and third opposing ends, a means for joining said first and second end caps inner ends directly to respective ones of said first and second conduits' outer opposing ends, and said sprayers male threaded bottom ends directly to predrilled holes at various upward and sideways angles and variously spaced locations to said conduits, and said end caps and
   g. for connecting said apparatus to a conventional liquid source via a garden hose type connection's male threaded end being connected to said connector's female threaded end so as to release a liquid flow through said apparatus and out of said sprayers in a controlled manner
   h. a container including a release valve being fluidly connected to and laying directly on top of said cylindrical side wall of said connector for selectively dispensing a cleaning solution into the liquid flow of said conventional liquid source;
   whereby a person can easily, economically, and effectively clean the undercarriage of a vehicle.

2. The apparatus of claim 1 wherein said connector, said t-connector, said first and second conduits, and said first and second end caps are composed of polyvinylchloride.

3. The apparatus of claim 2 wherein said t-connector, said first and second conduits, and said first and second end caps are cylindrical in shape.

4. The apparatus of claim 1 wherein said sprayers are made of a composite plastic.

5. The apparatus of claim 1 wherein said means for joining said first and second conduit's inner opposing ends to said t-connectors' second and third opposing ends consists of applying polyvinylchloride adhesive to said t-connector's second and third opposing ends and said first and second conduits' inner opposing ends thereupon inserting said first and second conduits' inner opposing ends into respective one of said t-connectors second and third opposing ends.

6. The apparatus of claim 1 wherein said means for joining said first and second end caps to said first and second conduits' outer opposing ends consists of applying polyvinylchloride adhesive to said first and second end caps' inner ends and said first and second conduits' outer opposing ends thereupon inserting said first and second conduits' outer opposing ends into respective ones of said first and second end caps' inner ends.

7. An apparatus of the type consisting of a connector of predetermined size having a first and second end, said first end being directly joined to a t-connector of predetermined size, said t-connector including second and third opposing ends connected directly to a respective inner opposing end of a first and second conduit of equal length and predetermined size, said first and second conduits having outer opposing ends joined directly to a respective first and second end cap of predetermined size, a plurality of sprayers of predetermined size being joined to said conduits and said end caps at various upward and sideways angles and variously spaced locations, said connector's first end connecting said apparatus to a conventional liquid source to supply a liquid flow to said apparatus, and a container including a release valve being fluidly connected to and laying directly on top of said connector for selectively dispensing a cleaning solution into the liquid flow; said container being fluidly connected at a location between said first and second ends of said connector.

8. The apparatus of claim 7 wherein said end caps, said conduits, said t-connector, and said connector are of a polyvinylchloride composition.

9. The apparatus of claim 8 wherein said end caps, said conduits, said t-connector, and said connector are of a cylindrical shape.

10. The apparatus of claim 7 wherein said sprayers are made of a plastic composite.

11. The apparatus of claim 7 wherein said connector's first end is a female threaded end is joined to loin to a garden hose type connections' male threaded end.

12. The apparatus of claim 7 wherein said connector's second end is a male threaded end to be joined to a singular end having female threading of said t-connector.

13. The apparatus of claim 7 wherein said first and second conduits' inner opposing ends are joined to said t-connectors' second and third opposing ends by applying polyvinylchloride adhesive to said t-connectors' second and third opposing ends and said first and second conduits' inner opposing ends thereupon joining said respective conduits' inner opposing ends to said t-connectors' second and third opposing ends.

14. The apparatus of claim 7 wherein said first and second conduits' outer opposing ends are joined to said end caps by applying polyvinylchloride adhesive to said first and second end caps' inner ends and said first and second conduits' outer opposing ends thereupon joining said respective conduits' outer opposing ends to said end caps' inner ends.

15. The apparatus of claim 7 wherein said sprayers include a male threaded bottom end to loin said sprayers to a respective predrilled hole on said conduits and said end caps at various upward and sideways angles and variously spaced locations.

* * * * *